US006912687B1

(12) United States Patent
Gates et al.

(10) Patent No.: US 6,912,687 B1
(45) Date of Patent: Jun. 28, 2005

(54) DISK ARRAY STORAGE SUBSYSTEM WITH PARITY ASSIST CIRCUIT THAT USES SCATTER-GATHER LIST

(75) Inventors: Dennis Gates, Witchita, KS (US); Rodney A. DeKoning, Augusta, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/568,996

(22) Filed: May 11, 2000

(51) Int. Cl.⁷ .............................. G06F 11/00; H02H 3/05
(52) U.S. Cl. ........................................... 714/800; 714/6
(58) Field of Search ........................... 714/6, 800, 801, 714/805; 711/114

(56) References Cited

U.S. PATENT DOCUMENTS 5,708,849 A * 1/1998 Coke et al. .................... 710/22
5,883,909 A * 3/1999 DeKoning et al. .......... 714/800
6,065,096 A * 5/2000 Day et al. .................... 711/114
6,145,017 A * 11/2000 Ghaffari ........................ 710/5
6,151,641 A * 11/2000 Herbert ........................ 710/22

* cited by examiner

*Primary Examiner*—Albert Decady
*Assistant Examiner*—Esaw Abraham
(74) *Attorney, Agent, or Firm*—Duft, Setter, Orilla & Bornsen LLC

(57) ABSTRACT

A parity assist circuit that provides multiple XOR calculations using a scatter-gather list is disclosed. The parity assist circuit includes a control circuit that obtains a plurality of source operands in response to a scatter-gather list, and an XOR engine that provides a plurality of XOR products computed from the supplied source operands. Destination and length parameters in the scatter-gather list are used by the XOR engine to store the XOR computation product and to determine the length of the data in the source and destination blocks to be computed. Preferably, the parity assist circuit is part of a RAID controller that includes a processor and a cache memory. The parity assist circuit preferably utilizes the scatter-gather list to gather required source operands from a memory and to scatter multiple XOR products to the memory before sending an interrupt to the processor or receiving additional setup instructions from the processor, thereby providing rapid and efficient parity calculations and improving overall system performance of the RAID storage subsystem.

34 Claims, 7 Drawing Sheets

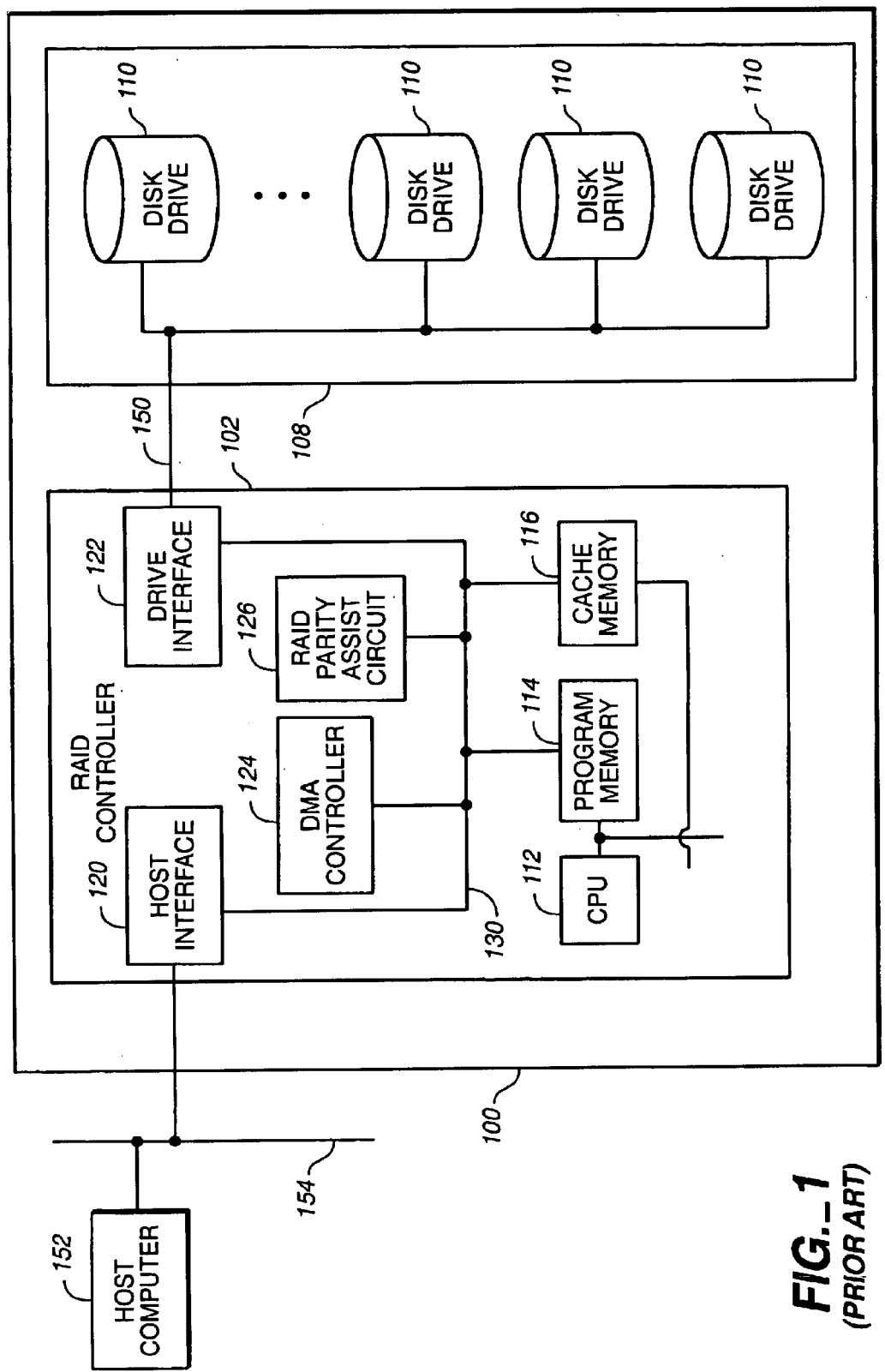
FIG._1 (PRIOR ART)

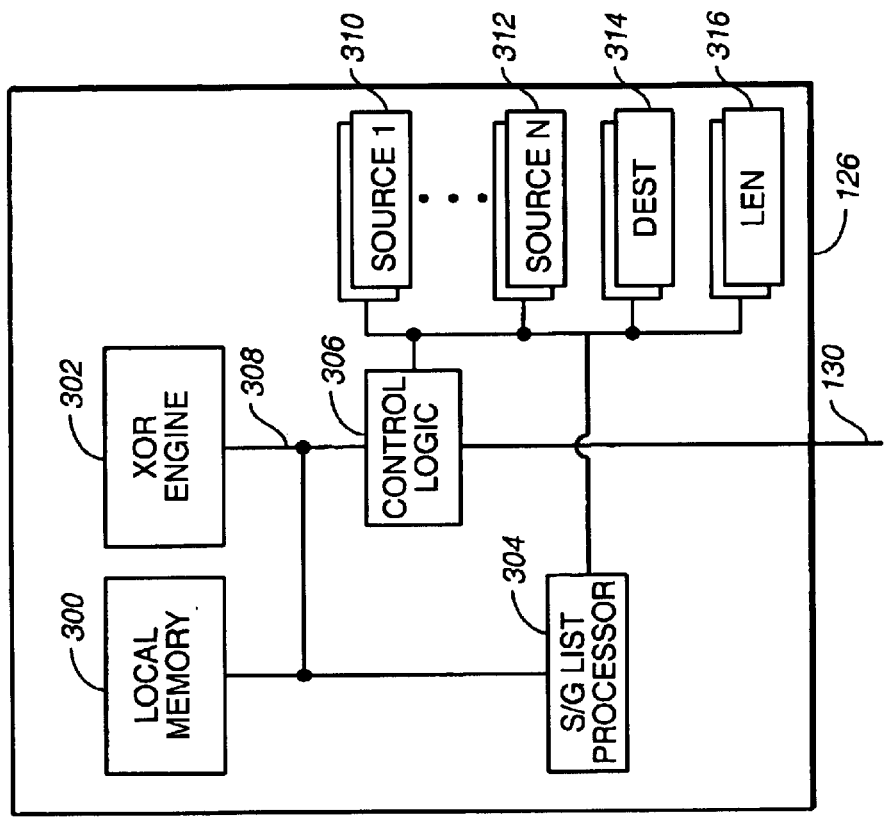
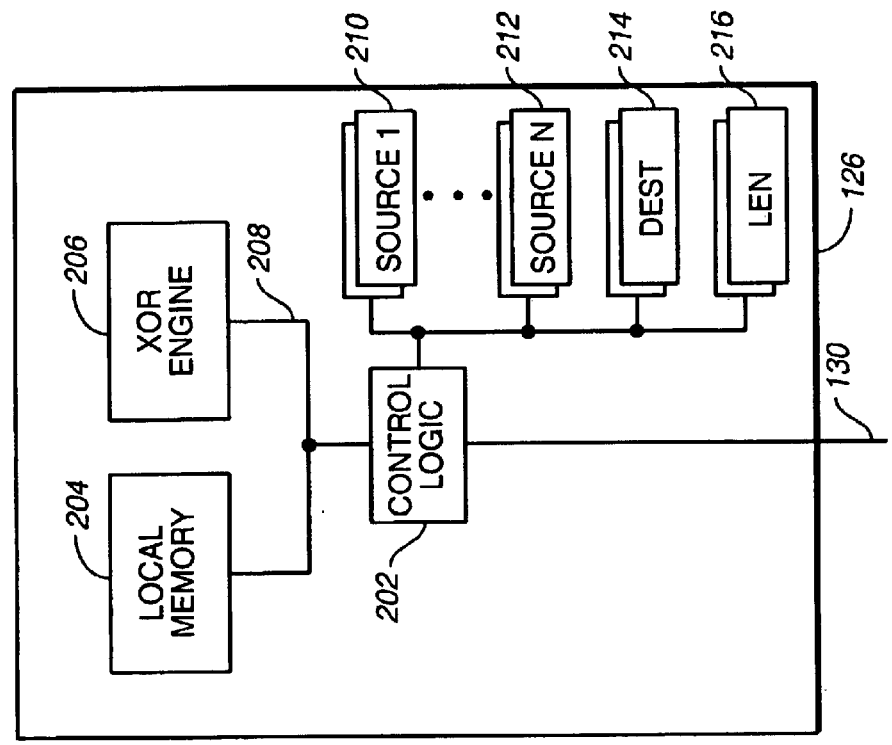

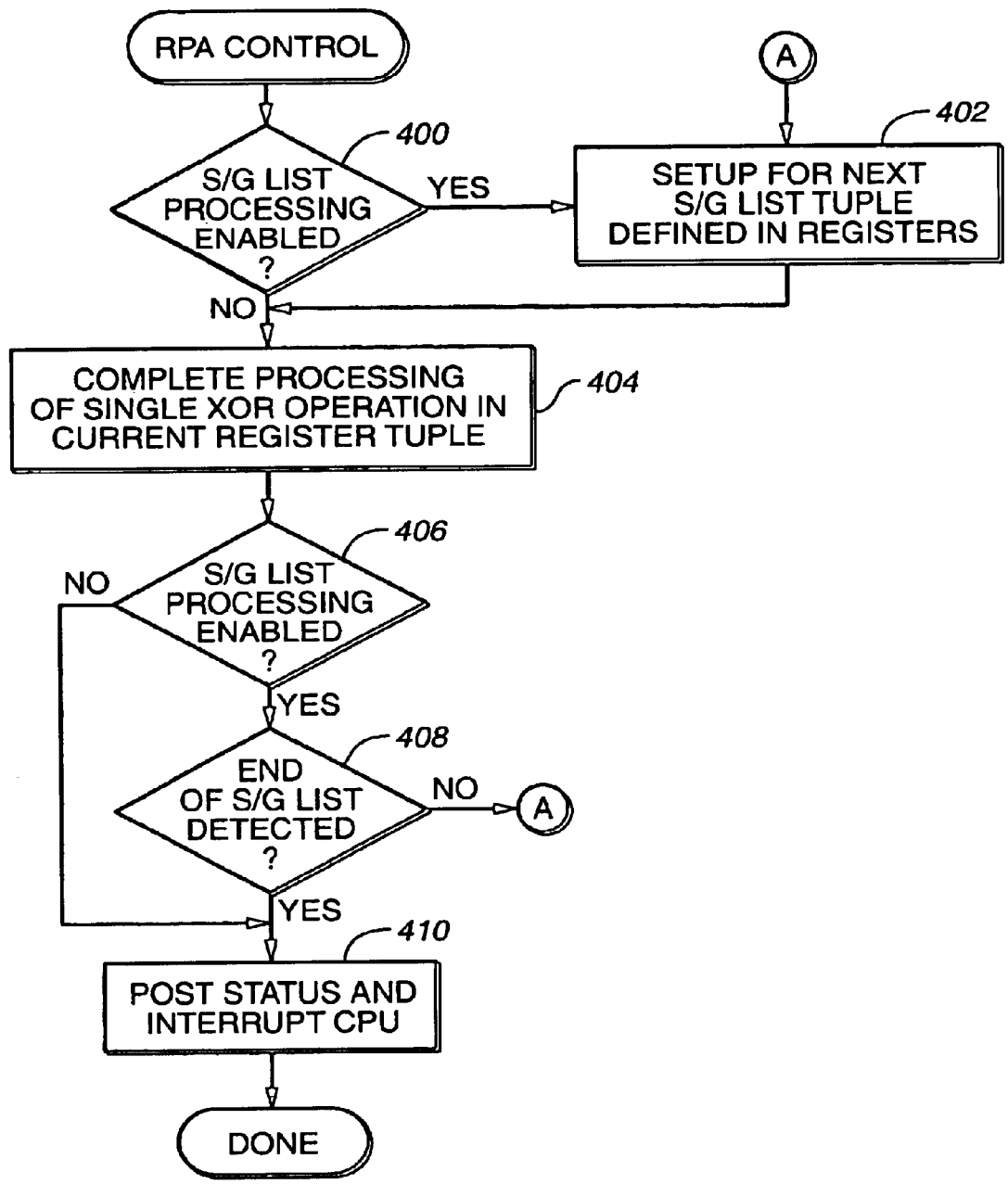
FIG._4

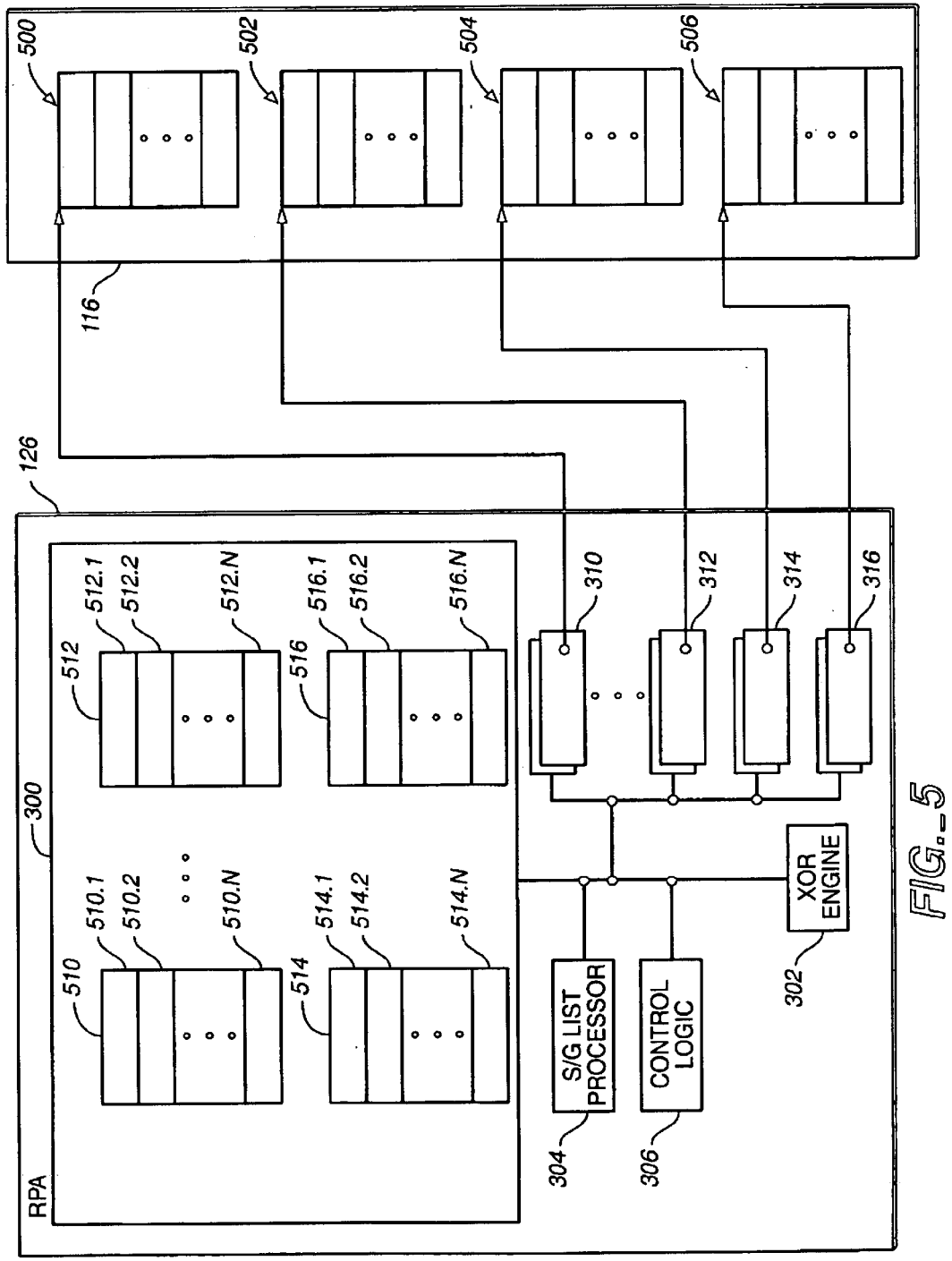
FIG._5

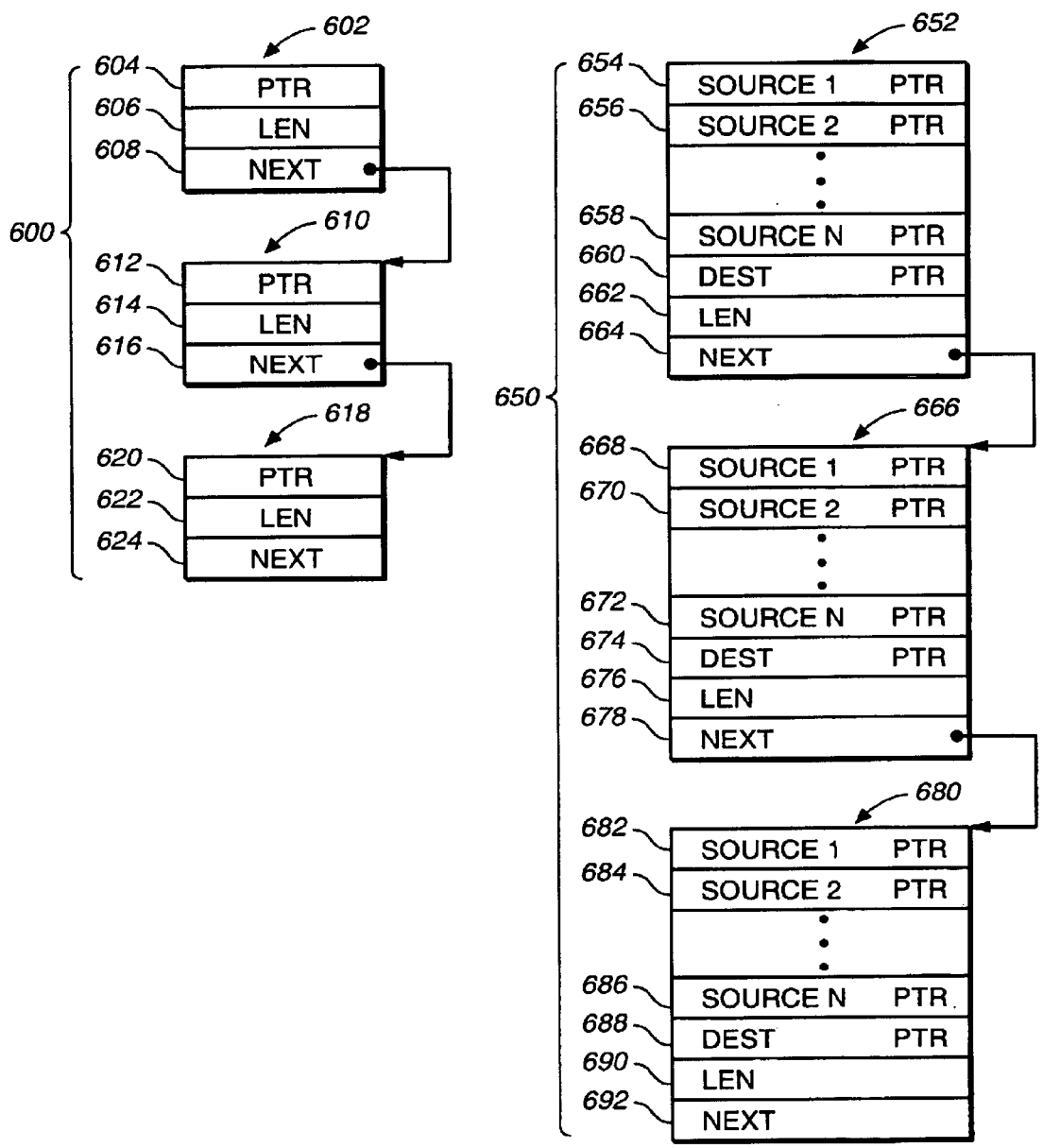
FIG._6

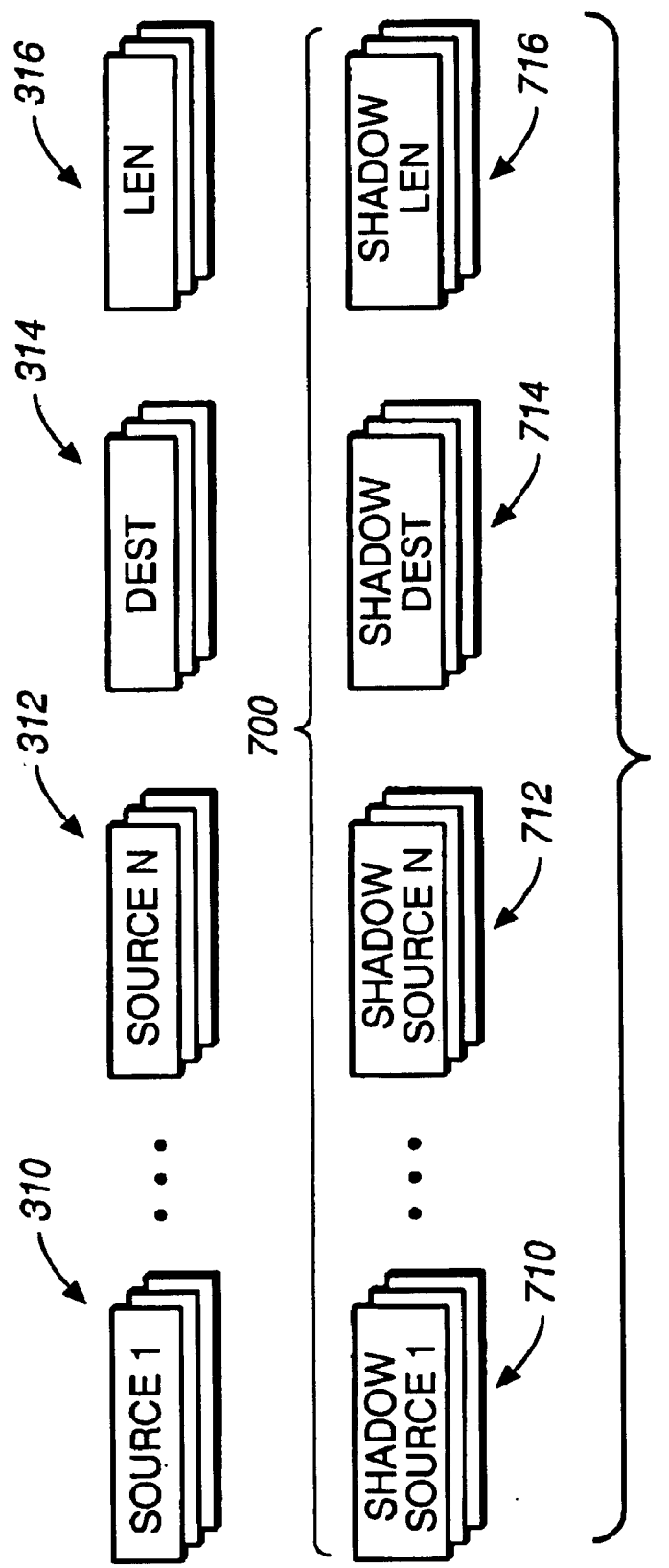
FIG._7

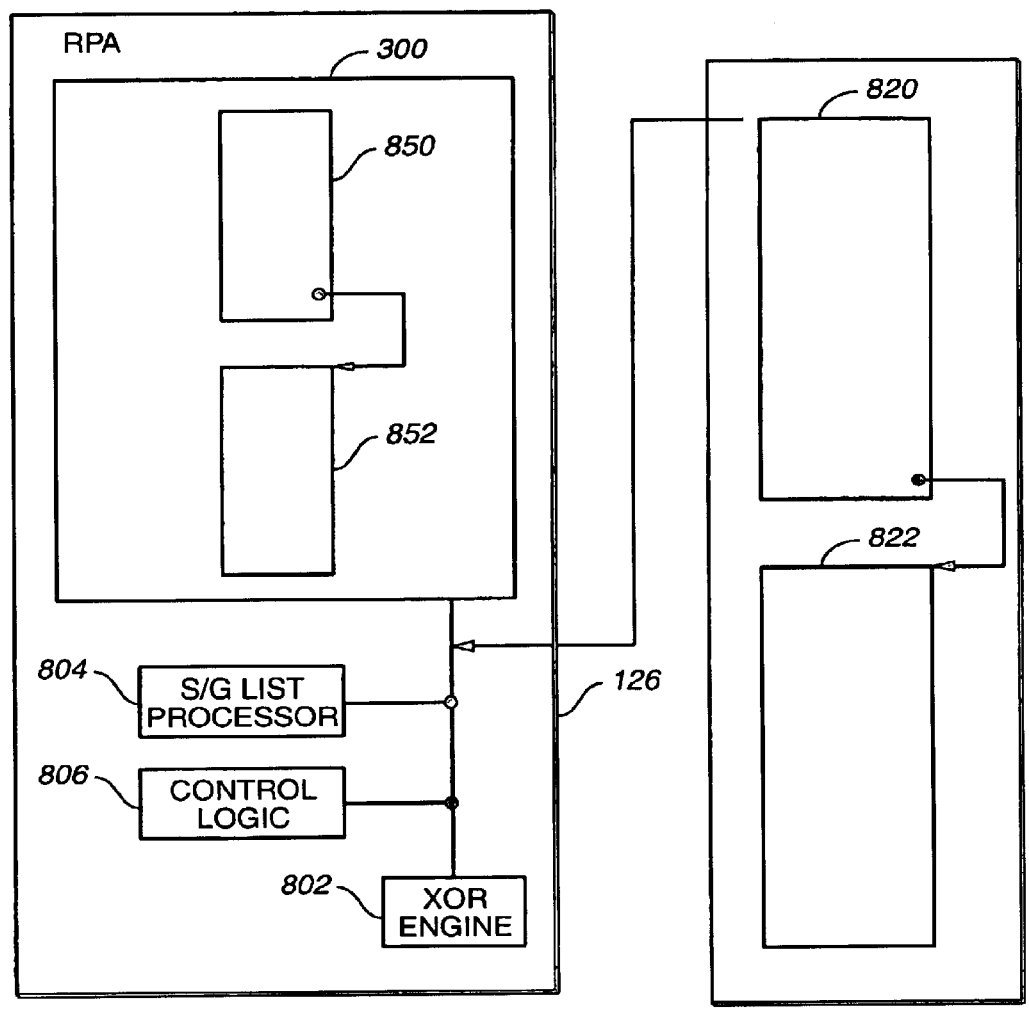
FIG._8

DISK ARRAY STORAGE SUBSYSTEM WITH PARITY ASSIST CIRCUIT THAT USES SCATTER-GATHER LIST

BACKGROUND OF THE INVENTION

1. Field of the Invention

The present invention relates generally to disk array storage subsystems, and more particularly to a parity assist circuit having integral scatter-gather list processing features useful in such a subsystem

2. Description of Related Art

Modem mass storage subsystems continue to provide increased storage capabilities to fulfill user demands from host computer applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystem.

A popular solution to these mass storage demands for increased capacity and reliability is the use of multiple smaller storage modules configured in geometries that permit redundancy of stored data to assure data integrity in case of various failures. These systems also frequently configure the array of smaller disk drives to enhance storage subsystem performance.

A redundant array of inexpensive (or independent) disks, commonly referred to as RAID, is a collection of disk drives which appears as a single (or virtual) large disk drive to a host computer. Part of the disk storage capacity is typically used to store redundant information about user data stored on the remainder of the storage capacity. This redundant information allows the disk array to continue functioning without the loss of data should an array disk drive member fail, and permits the regeneration of data to a replacement array disk drive member.

Several RAID disk array design alternatives were presented by David A. Patterson et al. in an article entitled *A Case for Redundant Arrays of Inexpensive Disks (RAID)*, University of California Report No. UCB/CSD 87/391, December 1987. This article discusses improvements in performance, reliability, power consumption and scalability that disk arrays provide over single large magnetic disk drives, as well as five disk array arrangements known as RAID levels 1–5.

RAID level 1 comprises N data disks for storing data and N additional mirror disks for storing copies of the information written to the data disks. RAID level 1 write functions require that data be written to two disks, the second mirror disk receiving redundant information, i.e., the same information provided to the data disk. When data is read, it can be read from either disk.

RAID level 2 protects data using a Hamming code. However, RAID level 2 is seldom used largely because it requires special features not found in standard disk drives.

RAID level 3 comprises N+1 disks in which N disks are used to store data and the additional disk is used to store redundant information, i.e., parity information. During RAID level 3 write functions, each block of data is divided into N portions for storing among the N data disks. The corresponding parity information is calculated from the data written to the N data disks and is written to a dedicated parity disk. When data is read, all N data disks must be accessed. The parity disk is used to reconstruct the data in the event of disk failure.

RAID level 4 also comprises N+1 disks in which N disks are used to store data and the additional disk is used to store parity information. RAID level 4 differs from RAID level 3 in that data to be saved is divided into blocks, and each block is stored on a single one of the data disks. Writes still require access to two disks, i.e., one of the N data disks and the parity disk. In a similar fashion, read operations typically need only access a single one of the N data disks unless the data to be read exceeds the block length stored on each disk. As with RAID level 3, the parity disk is used to reconstruct information in the event of disk failure.

RAID level 5 is similar to RAID level 4 except that parity information, in addition to the data, is distributed across the N+1 disks. Thus, each disk includes some blocks for storing data and some blocks for storing parity information. Where parity information is stored is controlled by an algorithm implemented by the user. RAID level 5 differs from RAID level 4 in that the parity information is distributed across the disks rather than concentrated on one, which provides the opportunity to perform concurrent write operations.

RAID levels 0 and 6 were defined after the Patterson et al. article. RAID level 0 involves disk striping without data protection. Disk striping distributes data across multiple disk drives to permit parallel operations. Strictly speaking, the absence of redundancy makes the term RAID a misnomer, however RAID level 0 is commonly used interchangeably with disk stripping. RAID level 6 expands upon RAID levels 4 and 5 by providing N+2 disks in which N disks are used to store data and 2 disks are used to store two independently computed sets of parity information.

RAID levels 3–6 have become collectively known as parity RAID. The data stored in the subsystem is logically divided into stripes each subdivided into smaller units often referred to as "blocks." A stripe is comprised of a group of related data blocks and a corresponding redundancy (i.e., parity) block (or blocks in RAID level 6 ). The parity data is calculated by determining the exclusive-OR (XOR) product of the associated data blocks. Advantageously, if one of the data blocks contains an error it can be reconstructed by calculating the XOR product of the remaining data blocks and the parity block. For instance, the XOR product of the second, third and fourth data blocks and the parity block is equal to the data in the first data block. Thus any missing or unavailable data block (or parity block) may be reconstructed from the remaining available blocks of any particular stripe.

RAID storage subsystems typically utilize a controller that shields the host computer from the details of managing the redundant array. In particular, the RAID controller typically performs all the above-identified parity computations with no intervention by, or even knowledge of the host system. The controller makes the subsystem appear to the host computer as one (or more) highly reliable, high capacity disk drive. Unbeknownst to the host system, the RAID controller distributes the host computer's data across numerous small independent disk drives with redundancy and error checking so as to improve subsystem reliability and/or performance. The RAID controller typically employs a central processing unit (CPU) and program memory that stores instructions for the CPU. RAID controllers also frequently provide cache memory to further improve performance. The cache memory is associated with the controller such that the storage blocks on the disk array are mapped to blocks in the cache memory. This mapping is transparent to the host computer. The host computer simply requests blocks of data to be read or written and the RAID controller manipulates the disk array and cache memory as required.

Posting the cached data to the disk drives is often done by a read-modify-write (RMW) method wherein the new data blocks to be posted are used in conjunction with the associated old data blocks and old parity data on the disk drives to compute the new parity data, as mentioned above. A second posting method, called the full write method (also referred to as a stripe write method or simply a stripe write) writes new data blocks and associated new parity data without reading the old data blocks or old parity data from the disk drives. Rather, all data blocks which comprise a stripe are resident in the cache memory, the new parity data is calculated therefrom, and the new data blocks and new parity block are written to the disk drives.

It is long known in the art that the CPU of the RAID controller can compute the XOR parity data as it reads and writes data from and to the disk drives (or as it receives data from the host systems). The CPU in a modern, high performance RAID controller has a number of responsibilities and can often be overloaded by its many computational functions. RAID controllers often also include a parity assist circuit for providing the XOR operations during parity calculations. Although the CPU could perform this function, the parity assist circuit relieves the CPU of this burden. For example, when the CPU determines that an XOR product is needed, it gives a short series of instructions to the parity assist circuit. These instructions typically include the address and length of a first operand, the address and length of a second operand, and the destination address and length for the result. In response to these instructions, the parity assist circuit obtains the first and second operands from the cache memory of the RAID controller, calculates the XOR product, and stores the XOR product at the destination address in the cache memory. In the meantime, the CPU may continue on to other operations while awaiting an interrupt from the parity assist circuit to signify that the XOR calculation is complete. As a result, the parity assist circuit saves the CPU a substantial amount of processing time.

Although the parity assist circuit helps speed the RAID storage subsystem, considerable room for improvement exists. For example, each time the CPU requests an XOR calculation from the parity assist circuit, the CPU generates a short series of setup instructions to compute a particular parity block from two source blocks. Each parity block computation therefore consumes CPU processing time to setup the computation parameters and start the parity assist circuit operating. Furthermore, each time the parity assist circuit completes an XOR calculation and generates an interrupt, the CPU halts the current operation and implements an interrupt routine. This typically involves saving CPU state information on a stack, executing an interrupt operation, then reloading the stored state information to resume the previous operation. Since XOR parity calculations are so prevalent in RAID storage subsystems, the high volume of CPU setup instructions to the parity assist circuit and subsequent interrupts by the parity assist circuit is a key performance factor.

Accordingly, a need exists for a parity assist circuit in RAID storage subsystems that reduces demands on processor overhead and improves performance.

SUMMARY OF THE INVENTION

The present invention solves the above and other problems, and thereby advances the useful arts, by providing a parity assist circuit that performs multiple XOR calculations using a scatter-gather list. Preferably, the parity assist circuit is part of a RAID controller and utilizes a scatter-gather list to provide multiple XOR products to the cache memory before sending an interrupt to the RAID controller CPU or receiving additional setup instructions from the processor. This structure provides rapid and efficient parity calculations and improves overall system performance by reducing overhead processing of the RAID controller's CPU.

Generally speaking, the parity assist circuit includes a scatter-gather list processor coupled with a control circuit that obtains a plurality of XOR operation operands/parameters in the form of a scatter-gather list, and an XOR engine that provides a plurality of XOR products in response to supplied operands and parameters. The destination locations of the XOR product computations are preferably also provided in the scatter-gather list definition.

In the preferred embodiment, a plurality of registers are defined within the parity assist circuit to define the scatter-gather list XOR operation parameters. In particular, registers for the first through N-th operands of the XOR operation, the destination location of the resulting XOR product and the length of the operation are provided in the parity assist circuit. In accordance with the present invention, these registers, rather than providing a single value for its corresponding parameter, provides a pointer to a list of such parameters. The first operand register points to a list of first operands to be used in a sequence of XOR operations. The second operand register points to a corresponding list of second operand values to be used in XOR computations and so on for all N operand registers and the destination register. The length of each XOR operation may be identified by a similar list of length entries pointed to by the value in the length register. In the preferred embodiment, the length of each operation is derived from a length field in the scatter-gather list entry of an operand—specifically a length portion of each scatter-gather list element identifying a source 1 operand value, Corresponding registers in the parallel sets of corresponding registers define a tuple of parameters for a single XOR operation. A plurality of such tuples define a scatter-gather list.

When started, the parity assist circuit scatter-gather list processor preferably reads the scatter-gather lists pointed to by the registers into a local memory associated with the parity assist circuit. The scatter-gather list processor then processes these scatter-gather lists to cause the XOR engine element within the parity assist circuit to generate all requested XOR parity values and store them at the requested destinations.

Alternate embodiments may support a variety of other formats or structures of scatter-gather lists. For example, a scatter-gather list may be a data structure with all parameters and operands integrated into data structure elements constructed by the RAID controller CPU and stored in memory of the RAID controller. The control circuit of the parity assist circuit first transfers the scatter-gather list(s) to the local memory of the parity assist circuit. The control circuit then processes the scatter-gather list(s) to perform the requests multiple XOR parity computations.

In the preferred embodiment, the operands and parameters specified by the scatter-gather lists regardless of the structure of the list are retrieved from appropriate memory external to the parity assist circuit (i.e., from the RAID controller's cache memory or direct from the host system memory as appropriate for the particular embodiment). Local memory within the parity assist circuit may be used as temporary scratchpad memory to perform the requested XOR computation. The XOR products so computed from the operands are then transferred to the external memory locations specified as destinations in the scatter-gather list(s).

It is therefore an object of the present invention to provide a parity assist circuit that increases the utilization of a processor that requires frequent parity calculations.

It is a further object of the present invention to provide a disk array controller with a unique parity assist circuit for performing high speed parity calculations.

It is another object of the present invention to provide a disk array controller with a parity assist circuit that requires fewer setup instructions and generates fewer interrupts than conventional parity assist circuits thereby enhancing the speed and efficiency of the processor.

It is a yet another object of the present invention to provide a disk array storage subsystem with enhanced throughput and performance.

It is still another object of the present invention to provide a RAID storage subsystem that implements parity RAID with rapid XOR calculations using a conventional XOR engine.

These and other objects, features and advantages of the invention will be further described and more readily apparent from a review of the detailed description of the preferred embodiments which follows.

BRIEF DESCRIPTION OF THE DRAWINGS

The following detailed description of the preferred embodiments can best be understood when read in conjunction with the following drawings, in which:

FIG. 1 is a high-level block diagram of a conventional RAID storage subsystem showing a parity assist circuit as generally known in the art;

FIG. 2 is a block diagram of a RAID parity assist circuit as shown in FIG. 1 and as presently practiced in the art;

FIG. 3 is a block diagram of an exemplary improved RAID parity assist circuit as shown in FIG. 1 and as taught by the present invention;

FIG. 4 is a flowchart describing an exemplary method of operating such an improved RAID parity assist circuit as shown in FIG. 3;

FIG. 5 is a block diagram of the improved RAID parity assist circuit of FIG. 3 further depicting the function thereof;

FIG. 6 shows exemplary scatter-gather list formats as may be utilized in the present invention;

FIG. 7 shows additional details of the preferred embodiment of the present invention wherein the improved RPA device has a plurality of tuples of parallel registers defined; and FIG. 8 depicts an alternative embodiment of the present invention devoid of the programmable registers.

DETAILED DESCRIPTION OF THE PREFERRED EMBODIMENTS

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a high-level block diagram of a conventional RAID storage subsystem 100 as generally known in the art in which the structures and methods of the present invention may be advantageously applied. RAID storage subsystem 100 includes RAID controller 102 which is in turn connected to disk array 108 via bus (or busses) 150 and to host computer 152 via bus(es) 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. Interface bus 154 between RAID controller 102 and host computer 120 may be any of several industry interface busses including SCSI, Ethernet (LAN), Token Ring (LAN), etc. The techniques of the present invention are most beneficially applied to SCSI interface connections between one or more host computers and the RAID storage subsystem. The concept of logical units (as discussed below) is native to the SCSI interfacing specifications. Other connectivity standards such as LAN may utilize the techniques of the present invention if appropriately translated to corresponding structures and protocols associated therewith.

RAID controller 102 includes central processing unit (CPU) 112, program memory 114 (e.g., ROM/RAM devices for storing program instructions and variables for the operation of CPU 112), and cache memory 116 for storing data and control information related to the data stored in disk array 108. RAID controller 102 further includes host interface 120 for interfacing with host computer 152, drive interface 122 for interfacing with disk array 108, direct memory access (DMA) controller 124 for assisting CPU 112 with transferring data to and from cache memory 116, and RAID parity assist (RPA) circuit 126 for assisting CPU 112 with parity calculations. CPU 112, program memory 114, cache memory 116, host interface 120, drive interface 122, DMA controller 124 and parity assist circuit 126 are connected together by bus 130 to exchange of information among the devices.

Those skilled in the art will recognize that the block diagram of FIG. 1 is intended merely as suggestive of typical designs of RAID controller devices. Specific design choices of busses and components and the interconnection between them are well known to those skilled in the art. FIG. 1 is therefore intended merely as suggestive of all such typical RAID controller designs and therefore shows the typical functional connections among typical components in a RAID controller.

DMA controller 124 transfers data between program memory 114 and cache memory 116 using a scatter-gather list constructed by CPU 112. The scatter-gather list contains multiple entries each of which define the starting address and size of a memory block in cache memory 116. Adjacent scatter-gather list entries represent non-contiguous memory blocks in cache memory 116 in order to increase the efficiency of read and write operations to and from the disk array 108. DMA controller 124 is also used to move blocks of data between cache memory 116 and the host computer 152 via host interface 120.

Scatter-gather lists in this known context of DMA controller 124 maps non-contiguous memory blocks in cache memory 116 to corresponding host memory locations or disk drive block addresses. The term scatter-gather in this context refers to the concept that the various blocks of the source and/or destination of a DMA data movement operation may be in non-contiguous locations of memory or disk. For instance, during a write operation, the scatter-gather list entries are arranged so that non-contiguous memory blocks in cache memory 116 intended for a given disk drive are continuously written to consecutive addresses of that disk drive. Similarly, during a read operation, the scatter-gather list entries are arranged so that consecutive addresses are continuously read from a disk drive and transferred to non-contiguous memory blocks in cache memory 116.

FIG. 2 is a block diagram of conventional RAID parity assist circuit (RPA) 126 as presently known in the art. Such a known RPA 126 includes control circuit 202, local memory 204, and XOR engine 206. Control circuit 202 is connected to bus 130 for communicating with the other components in RAID controller 102. In addition, control circuit 202, local memory 204 and XOR engine 206 are connected together by bus 208. Control circuit 202 is preferably implemented by a finite state machine in digital logic circuits, local memory 204 can be implemented by an SRAM, and XOR engine 206 can be implemented by an asynchronous logic circuit. Those skilled in the art will recognize a variety of design choices for implementing these components of RPA 126.

As presently practiced in the art RPA 126 has control registers 210 . . . 216 programmed by CPU 112 to define the desired XOR computation. For example, source 1 register 210 may be programmed with the address in cache memory of a first source block for the XOR parity computation. Other operands to be used in the XOR computation are programmed into other source registers up to and including source N register 212. Destination register 214 is programmed with the address for the resultant XOR parity block computed by XOR operation on the two provided source operands. Length register 216 is programmed to indicate the length of the data block XOR operation to be performed. Those skilled in the art will recognize that the specific set of registers utilized is a matter of design choice in implementation of such a device.

Further, it will be noted that each register 210 . . . 216 is shown as a bank of multiple such registers—a set of registers. Each related register of the parallel sets or banks of registers is used to define a single XOR operation. Specifically, source 1 register 210 is a sequence of multiple registers (parallel sets) each of which identifies a source operand for one XOR operation. In like manner other source registers including source N register 212 is a sequence of registers each of which defines an N-th source operand corresponding to a source 1 operand in a register 210. Destination register 214 and length register 216 are likewise parallel sets or banks of registers defining corresponding destinations and lengths for XOR operations. A single XOR operation is therefore defined by a tuple of registers, a source 1 register 210 and related other operands up to and through a corresponding source N register 212, a corresponding destination register 214 and a corresponding length register 216. A list of such operations is therefore defined by multiple such tuples in the parallel sets of corresponding registers. The end of the list may be flagged by, for example, a zero length value in a length register 216 of a tuple.

CPU 112 may program multiple XOR operation requests into the parity assist circuit 126 of FIG. 2 by programming each of the multiple tuples with a set of parameters defining one of the multiple desired XOR computation operations. It is known to reduce the interrupt overhead processing imposed on CPU 112 by permitting each of the sets of registers to selectively interrupt or not interrupt the CPU upon completion of the corresponding XOR operation. A small sequence of such operations may therefore be programmed into the multiple sets of registers wherein only the last XOR operation defined by the sets of registers will interrupt the CPU 112. However, the number of such requests that may be processed without interrupting the CPU is limited to the number of tuples supported in the parallel sets of registers. A complex sequence of many XOR operations would easily require more operations than may be easily specified in a limited number of such tuples. The cost of adding a significant number of additional registers to extend the complexity of sequences of XOR operation would be prohibitive. It is an important performance benefit to reduce the interrupt processing overhead imposed upon CPU 112. A long complex set of XOR operations as is common in modem RAID control techniques would impose a significant burden for overhead processing even in the architecture shown in FIG. 2 having a plurality of sets (tuples) of registers. The present invention discussed further below allows essentially unlimited complexity of such sequences by use of scatter-gather lists.

FIG. 3 is a block diagram of an exemplary improved RPA 126 of the present invention. Control logic 306 controls the operation of local memory 300 and XOR engine 302 via internal bus 308 in much the same manner as described above with respect to FIG. 2. RPA 126 of FIG. 3 adds a scatter-gather list processor 304 coupled to control logic 306, local memory 300 and XOR engine 302. However, the registers defining the operation to be performed are now (optionally) pointing to lists defining complex sequences of operations to be performed—a scatter-gather list of XOR operations to be performed. The scatter-gather lists pointed to by the register values are read into local memory 300 by scatter-gather list processor 304. Scatter-gather list processor (S/G processor) 304 provides the enhanced features of the RPA 126 of the present invention.

S/G processor 304 processes a first XOR operation defined by the scatter-gather lists read into local memory 300. A tuple in the parallel sets of registers 310 . . . 316 defines a scatter-gather list to be processed rather than a single XOR operation. After reading the scatter-gather list into local memory 300, the SIG list processor 304 loads a first XOR operation request from the list into the first tuple of the registers 310 . . . 316 and starts the XOR computation. Upon completion of a first XOR operation the SIG processor 304 looks for a next XOR operation defined in the scatter-gather list before indicating completion of the operation to CPU 112. Each XOR operation defined in the scatter-gather list in local memory 300 is processed in turn by S/G list processor and the corresponding XOR operation performed until all requests in the list are processed. At completion of the list processing, the CPU 112 is interrupted to indicate that the entire list of requests has been completed. Further details of the operation of improved RPA 126 are provided herein below.

The specific format of a scatter-gather list to be processed by S/G processor 304 is a matter of design choice. A number of scatter-gather list structures are known to those skilled in the art. The preferred structure for any given RPA design is one that is common to other scatter-gather lists used in the RAID controller. For example, CPU 112 typically creates scatter-gather lists to control the operation of DMA controller 124. A preferred embodiment is therefore one that uses a similar (if not identical) format to that used for DMA controller 124 of the RAID controller.

In the exemplary preferred embodiment of FIG. 3, the scatter-gather list is defined by tuples in the parallel sets of registers for each of the registers used to define a parameter of an XOR operation. When used with scatter-gather list processing, each register of a tuple points to a list of the corresponding parameter values for each XOR operation. A list of source 1 operand values is pointed to by register 310. A list of destination values is pointed to by register 314, etc. The combination of all lists defines the scatter-gather list generated by CPU 112. All are read into local memory 300 by S/G list processor 304.

Those skilled in the art will recognize other formats useful in particular applications. As noted above, the preferred structure of the scatter-gather list is a matter of design choice for the implementer.

In the preferred embodiment, scatter gather list formats used for other purposes by CPU 112 (of FIG. 1) are used. This simplifies processing by CPU 112 by re-using scatter-gather list formats from other functions when constructing lists of XOR operations. Such scatter-gather lists are often used for example when moving data between a host system and the RAID controller's cache memory or between the cache memory and the storage devices. Many existing scatter-gather list formats include a length field with each element of the list. In the preferred embodiment the length register 316 of FIG. 3 need not be used when processing scatter-gather lists. Rather, a length portion of each element of the source 1 scatter-gather list provided by CPU 112 in register 310 is used to define the length of each XOR operation.

FIG. 6 shows exemplary scatter-gather list formats as may be utilized in the present invention. List 600 comprises a plurality of list elements 602, 610 and 618. Each element includes a plurality of fields. A pointer field in each element points to the data block used by this element in the XOR operation (PTR 604 in element 602, PTR 612 in element 610 and PTR 620 in element 618). A length field in each element indicates the length of the data block pointed to by the element (LEN 606 in element 602, LEN 614 in element 610 and LEN 622 in element 618). A next element point in each element points to the next element in a chain of such elements (NEXT 608 in element 602, NEXT 616 in element 610 and NEXT 624 in element 618).

A pointer to the head of list 600 is programmed by CPU 112 into each of the registers 310 . . . 314 of the parity assist circuit 126 to define a first series of XOR operations. The length value in the list element for the source 1 operand of each XOR operation is used as the length of the operation to thereby obviate the need for a separate length value list. This preferred embodiment is suggested by the structure of existing scatter-gather lists in one particular existing controller architecture. Since the length value is already encoded into each scatter-gather list element a separate length value is not required as a listed to be programmed in register 316. Those skilled in the art will recognize the equivalency of providing a scatter-gather list for length values as well. Such design choices are well known to those skilled in the art.

This format is preferred in that it provides a degree of compatibility with the prior architecture noted in FIG. 2. The use of such scatter-gather list processing may be selectively enabled or disabled in the improved parity assist circuit 126 of the invention. A few XOR operations may be programmed in the registers as is presently known in the art by placing the parameter values in the parallel sets of registers 310 . . . 316. Alternatively, scatter-gather list processing may be enabled in the parity assist circuit 126 and the registers 310 . . . 316 may be programmed with pointers to lists of corresponding parameter values.

Such a feature to enable or disable the enhanced operation would preferably be implemented as a signal applied to the RPA circuit by the controller's CPU. Such design choices are well known in the art and a variety of other techniques to enable and disable the enhanced operations will occur to those skilled in the art.

An alternative embodiment of a combined scatter-gather list is also shown in FIG. 6. Scatter-gather list 650 is another common format for such lists wherein the parameters for one XOR operation are all combined in an element of a list. Each element of the list defines all parameters for a single XOR operation. For example, element 652 of list 650 contains source operand pointer 652 . . . 658, a destination operand pointer 660, a length value 662 and a pointer to the next element 664. Subsequent elements in the linked list (666 and 680) similarly contain all parameters required for their respective XOR operations (i.e., parameters 668 . . . 678 and 682 . . . 692 for elements 666 and 680, respectively).

As noted above, a preferred scatter-gather list format is one that maintains compatibility with formats for other scatter-gather lists used within the RAID controller. The specific format used in practice of the improved RAP of the present invention is a matter of design choice well known to those skilled in the art.

FIG. 5 further describes the function of scatter-gather list processor 304 (in conjunction with control logic 306) to perform the scatter-gather list processing as described above. CPU 112 (not shown) initially programs registers 310 . . . 314 to point at corresponding lists of parameter values 500 . . . 504 stored, for example, in cache memory 116 of the RAID controller. When RPA 126 is started, scatter-gather list processor 304 first retrieves the lists 500 . . . 504 from memory 116 and copies each list to its local memory 300. The copied lists 510 . . . 514 are then processed by scatter-gather list processor 304 to perform the desired sequence of XOR parity computations. As noted above, in the preferred embodiment, there is no need for a separate scatter-gather list of length parameters (i.e., register 316 and corresponding lists 506 and 516 are not necessary). Rather, the length of each XOR operation in each element of the parallel lists may be determined as the length parameter in each element of the source 1 operand list (list 500 and 510 as pointed to by the pointer value in register 310).

Those skilled in the art will recognize that the scatter-gather lists may be retrieved in portions if the aggregate length of the lists is too long to save in local memory 300. In other words, elements of the parallel scatter-gather lists (500 . . . 506) may be retrieved as needed for the list processing by scatter-gather list processor 304. Lengthy scatter-gather lists may easily exceed the limited capacity of local memory 300.

Specifically, a first element 510.1 of list 510 is copied to register 310. A corresponding element 512.1 . . . 516.1 of each of the related parallel lists 512 . . . 516, respectively, is copied to a corresponding register 312 . . . 316, respectively. These values, 510.1 . . . 516.1, represent a first tuple, a first XOR operation of the scatter-gather lists 510 . . . 516. Scatter-gather list processor 304 (in conjunction with control logic 306) then initiates the XOR computation via XOR engine 302 operating using the values in registers 310 . . . 316. The computation involved in this first XOR operation is as known in the art as discussed above. When this first operation is completed, scatter-gather list processor 304 is next operable to copy elements defining the second tuple in the lists to the registers. Specifically, elements 510.2 . . . 516.2 of lists 510 . . . 516, respectively, are copied to registers 310 ... 316, respectively. XOR engine 302 is again started to perform the XOR computation presently defined in the registers 310 ... 316. This sequencing of XOR engine 302 and registers 310 ... 316 by scatter-gather list processor 304 continues through elements 510.N ... 516.N. When scatter-gather list processor completes processing of all N tuples defined in the copied lists 510 ... 516, the CPU 112 (not shown) will be notified of completion of the entire list of operations.

Those skilled in the art will recognize similar functional relationships appropriate to other formats of scatter-gather lists. As noted above, the preferred scatter-gather list format and associated processing logic is determined for each application. Preferably the format is that of an existing scatter-gather list function performed within the RAID controller. The preferred format described herein permits backward compatibility with operation of known parity assist circuits such as that shown in FIG. 2.

FIG. 4 is a flowchart describing operation of the improved RPA of the present invention. As described in FIG. 4, the RPA scatter-gather list structure is presumed to be that described above as the preferred embodiment processing tuples of XOR operations as defined by the parallel set of registers (a plurality of tuples). Those skilled in the art will recognize that a similar method may be utilized with minor modifications as appropriate to accommodate the particular scatter-gather list structure selected for a particular application.

The method of FIG. 4 starts when the CPU 112 of the RAID controller programs the parallel sets registers 310 ... 316 of the improved RPA 126 to define a single XOR operation or a scatter-gather list of operations and starts the RPA. Element 400 is first operable to detect whether the CPU 112 has enabled scatter-gather list operation of the RPA. If so, element 402 is next operable to setup the RPA operation to process the next (first) XOR operation requested in the first tuple of the RPA register sets. S/G list processor 304 fetches the parameters defined by the next entry in the scatter-gather lists copied to local memory 300.

Processing then continues with element 404. If scatter-gather list processing is not enabled in the improved RPA by CPU 112, processing jumps immediately to element 404.

Element 404 then processes a single XOR operation as defined by the present parameters defined in RPA registers 310 ... 316. When the single XOR computation is completed element 406 again determines whether scatter-gather list processing is enabled. If not, processing is completed and element 410 posts a completion status as required by CPU 112 and interrupts CPU 112 to signify the operation is complete. As known in the art and as shown in FIG. 2, a next operation may be programmed in a next tuple of the registers 310 ... 316 when scatter-gather list processing is disabled. In this case, the processing of FIG. 4 will restart on the next operation pre-programmed by CPU 112 in the next tuple of the parallel sets of registers 310 ... 316.

If scatter-gather list processing is enabled in the improved RPA, processing continues with element 408 to determine whether the end of the scatter-gather list has been detected. As noted above, the end of the list may be signified by a special reserved value in a scatter-gather list entry such as a zero length field or by a flag value associated with the last valid entry. Such design choices for an end of list signal are well know to those skilled in the art.

Details of the control circuit of the RPA to cause a sequencing through the plurality of entries in a scatter-gather list is a well known matter of design choice for those skilled in the art. Further, as noted above, the improved RPA of the present invention may be easily modified to accommodate any of several scatter-gather list structures and formats. The details of the control logic design to sequence through the list of entries is therefore dependent upon the specific scatter-gather list format used in the RPA application. All such control circuit designs are a matter of well known design choices to those skilled in the art.

FIG. 7 shows additional details of the preferred embodiment of the present invention wherein the improved RPA device has a plurality of tuples (sets) of parallel registers defined. A first portion of such registers are exposed to the CPU of the RAID controller for use in conjunction with the known technique of programming register sets to reflect each desired XOR operation. A second portion of the registers are hidden from access by the CPU of the RAID controller and are used by the scatter-gather list processor in manipulation of the scatter-gather lists pointed at by the first portion of registers.

Specifically, FIG. 7 shows the standard ("exposed") registers 310 ... 316 as described above with respect to FIG. 3. In addition, a shadow set of registers 700 are shown. A shadow source 1 set of registers 710 is used by the scatter-gather list processor (304 of FIG. 3) to process scatter gather lists associated with source 1 operands of an XOR operation. In like manner, shadow source 2 registers 712, shadow destination registers 714 and shadow length registers 716 are used by the scatter-gather list processor in performing its function.

When operating in a compatibility mode with prior know techniques (as shown in FIG. 2 and as described above), all standard registers (310 ... 316) and shadow registers (710 ... 716) may be exposed to the CPU for programming in the known manner (wherein each tuple of registers specifies an XOR operation to be performed). When operating in the scatter-gather list processing enhanced mode of operation, the CPU has access only to the standard exposed registers 310 ... 316. The shadow registers are used by the RPA in processing each element of the parallel scatter-gather lists. In particular, as noted above, the RAID controller CPU programs pointers to scatter-gather lists in exposed registers 310 ... 314. The CPU may program a set of pointers to a parallel set of scatter-gather lists in each tuple of registers in the standard exposed set of registers 310 ... 314. As noted above, the length register is not used in this mode in the preferred embodiment. Rather, the length of each XOR operation is determined from the length value in each scatter-gather list element of the source 1 scatter-gather list.

For each set of lists pointed to by one tuple of exposed registers, the scatter-gather list processor processes the list of XOR operations by decomposing the lists into individual XOR operations (after copying the lists to the local memory as noted above). Each element in the parallel scatter-gather lists defines one XOR operation the parameters of which are copied into one tuple of the hidden ("shadow") registers 700. The XOR engine and control logic (302 and 306 of FIG. 3, respectively) then processes individual XOR operations as defined by the tuple in the shadow registers.

Still more specifically, the scatter-gather list processor may program a plurality of such individual operations into the shadow registers so as to prepare a continuous source of operations for processing by the XOR engine. In like manner, the RAID controller CPU may program additional scatter-gather lists into the tuples represented by the exposed registers. In this manner large sequences of XOR operations may be programmed to permit essentially continuous operation of the RPA device with minimal overhead processing required by the RAID controller CPU.

Element 402 of FIG. 4 discussed above performs the processing to enter parameters of a single XOR operation defined in the scatter-gather list into the registers of the RPA. As noted herein above, the scatter-gather list processor enters such parameters into the hidden (shadow) registers of the RPA. In addition, element 402 represents the processing of either a single XOR operation from a single element of the scatter-gather lists or may represent the processing to program a plurality of such operations from multiple elements of the scatter-gather lists in the multiple tuples of the shadow register set. Such design choices in the practice of the invention are well known to those skilled in the art.

FIG. 8 depicts an alternative embodiment of the present invention devoid of the programmable registers discussed above with respect to FIG. 3. As noted above, the preferred embodiment uses such registers to permit backward compatibility with a presently known RPA architecture. When scatter-gather list processing in the preferred RPA is enabled, the registers (exposed and hidden portions) are used in a manner to enable scatter-gather list processing. When such scatter-gather list processing is disabled, the preferred embodiment RPA uses the registers as tuples each defining a requested XOR operation as presently known in the art.

In the alternative embodiment of FIG. 8, no such backward compatibility is required. Rather, the scatter-gather list processor 804 in conjunction with control logic 806 directly accesses scatter-gather lists 820 and 822 in cache memory 116 and copies them into local memory 300 of RPA 126. Scatter-gather list processor 806 then coordinates processing with XOR engine 802 to perform the XOR operations defined in the copied scatter-gather lists 850 and 852. As noted above, scatter-gather lists 820 and 822 are formatted as may be defined for other purposes in the RAID controller. The CPU of the RAID controller may have previously defined scatter-gather lists 820 and 822 for another purpose. RPA 126 via scatter-gather list processor 804 therefore uses this existing format to further ease the overhead processing burden imposed on the CPU.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A parity assist circuit for use with a controller, comprising:
    a scatter-gather list processor adapted for coupling to a cache memory of the controller to process a scatter-gather list each entry of which specifies parameters of at least one XOR computation to be performed; and
    an XOR engine coupled to said scatter-gather list processor that produces an XOR product of data stored in the cache memory in accordance with parameters supplied by said scatter-gather list processors,
    wherein the parity assist circuit is operable in accordance with parameters supplied by said scatter-gather list processor to read data previously stored in the cache memory by operation of the counter, and
    wherein the parity assist circuit is operable to read the data to compute the XOR product without transferring the read data to a device external to the controller, and
    wherein the parity assist circuit is configurable to generate a single interrupt applied to a CPU of the controller regardless of the number of XOR products computer by its operation.

2. The circuit of claim 1 further comprising:
    registers for defining parameters for an XOR computation; and
    a control circuit coupled to said scatter-gather list processor and coupled to said XOR engine and coupled to said registers wherein said scatter-gather list is defined by values in said registers.

3. The circuit of claim 2 wherein said registers include:
    a plurality of operand source registers wherein a value in each operand source register of said plurality of operand source registers points to a list of operand source values to be used in XOR computations; and
    a destination register wherein a value in said destination register points to a list of destination values corresponding to said list of operand source values and wherein each destination value of said list of destination values points at a location for storage of the XOR product of corresponding operand source values in the lists of operand source values.

4. The circuit of claim 3 wherein said registers further include:
    a length register wherein a value in said length register points to a list of length values corresponding to said operand source values and wherein each length value identifies a number of data elements in said operand source values to be used in an XOR computation.

5. The circuit of claim 3 wherein a length value for each said XOR computation is derived from a value associated with a corresponding one of said operand source values.

6. The circuit of claim 3 further comprising:
    a local memory within said parity assist circuit and coupled to said control circuit and coupled to said scatter-gather list processor wherein said scatter-gather list is initially stored external to said parity assist circuit and wherein said control circuit reads said scatter-gather list and stores said scatter-gather list in said local memory for processing by said scatter-gather list processor.

7. The circuit of claim 6 wherein said scatter-gather list processor is operable to program said registers with parameters derived from said scatter-gather lists in said local memory to enable said XOR engine to perform requested XOR operations.

8. The circuit of claim 7 wherein said scatter-gather list is iteratively operable to program a plurality of XOR operations in sets of said registers.

9. The circuit of claim 7 wherein said registers comprise:
    a first portion exposed for programming by devices external to said circuit; and a second portion hidden from said devices external to said circuit.

10. The circuit of claim 9 wherein said scatter-gather list processor is operable to program said registers in said second portion with parameters derived from said scatter-gather lists in said local memory to enable said XOR engine to perform requested XOR operations.

11. The circuit of claim 1 further comprising:
    a control circuit coupled to said scatter-gather list processor and coupled to said XOR engine wherein the control circuit notifies an attached host of completion of XOR operations only at the completion of all XOR operations specified in said scatter-gather list.

12. The circuit of claim 1 further comprising: a local memory within said circuit and coupled to said scatter-gather list processor and coupled to said XOR engine wherein said scatter-gather list is initially stored external to said parity assist circuit and wherein said scatter-gather list processor reads said scatter-gather list and stores said scatter-gather list in said local memory for processing by said scatter-gather list processor and by said XOR engine.

13. The circuit of claim 12 wherein said scatter-gather list includes a plurality of elements and wherein each element of said plurality of elements defines all said parameters of an XOR operation.

14. A disk array storage system including:
a controller for controlling said disk array system; and
multiple disk drives coupled to said controller for storing data on behalf of a host computer,
wherein said controller includes:
a processor;
a cache memory for storing data; and
a parity assist circuit,
wherein said parity assist circuit includes:
a scatter-gather list processor to process a scatter-gather list each entry of which specifies parameters of at least one XOR computation to be performed on a portion of the data; and
an XOR engine coupled to said scatter-gather list processor that produces an XOR product in accordance with parameters supplied by said scatter-gather list processor,
wherein the parity assist circuit is operable in accordance with parameters supplied by said scatter-gather list processor to read data previously stored in the cache memory by operation of the controller, and
wherein the parity assist circuit is operable to read the data to compute an XOR product without transferring the read data to a device external to the controller, and
wherein the parity assist circuit is configurable to generate a single interrupt applied to the processor regardless of the number of XOR products computed by its operation.

15. The system of claim 14 wherein the parity assist circuit further comprises: registers for defining parameters for an XOR computation; and a control circuit coupled to said scatter-gather list processor and coupled to said XOR engine and coupled to said registers wherein said scatter-gather list is defined by values in said registers.

16. The system of claim 15 wherein said registers include:
a plurality of operand source registers wherein a value in each operand source register of said plurality of operand source registers points to a list of operand source values to be used in XOR computations;
a destination register wherein a value in said destination register points to a list of destination values corresponding to said list of operand source values and wherein each destination value of said list of destination values points at a location for storage of the XOR product of corresponding operand source values in the lists of operand source values; and
a length register wherein a value in said length register points to a list of length values corresponding to said operand source values and wherein each length value identifies a number of data elements in said operand source values to be used in an XOR computation.

17. The system of claim 16 wherein the parity assist circuit further comprises:
a local memory within said circuit and coupled to said control circuit and coupled to said scatter-gather list processor wherein said scatter-gather list is initially stored external to said parity assist circuit and wherein said control circuit reads said scatter-gather list and stores said scatter-gather list in said local memory for processing by said scatter-gather list processor.

18. The system of claim 17 wherein said scatter-gather list processor is operable to program said registers with parameters derived from said scatter-gather lists in said local memory to enable said XOR engine to perform requested XOR operations.

19. The system of claim 18 wherein said scatter-gather list is iteratively operable to program a plurality of XOR operations in sets of said registers.

20. The system of claim 18 wherein said registers comprise:
a first portion exposed for programming by devices external to said circuit; and
a second portion hidden from said devices external to said circuit.

21. The system of claim 20 wherein said scatter-gather list processor is operable to program said registers in said second portion with parameters derived from said scatter-gather lists in said local memory to enable said XOR engine to perform requested XOR operations.

22. The system of claim 14 further comprising:
a control circuit coupled to said scatter-gather list processor and coupled to said XOR engine wherein the control circuit notifies an attached host of completion of XOR operations only at the completion of all XOR operations specified in said scatter-gather list.

23. The system of claim 14 further comprising:
a local memory within said circuit and coupled to said scatter-gather list processor and coupled to said XOR engine wherein said scatter-gather list is initially stored external to said parity assist circuit and wherein said scatter-gather list processor reads said scatter-gather list and stores said scatter-gather list in said local memory for processing by said scatter-gather list processor and by said XOR engine.

24. The system of claim 23 wherein said scatter-gather list includes a plurality of elements and wherein each element of said plurality of elements defines all said parameters of an XOR operation.

25. The system of claim 23 wherein said scatter-gather list is used by said processor for purposes within said system in addition to use by said parity assist circuit.

26. A parity assist circuit for use with a controller comprising:
an XOR engine for computing XOR parity values using data stored in a cache memory of the controller in accordance with parameters applied to the XOR engine;
scatter-gather means for processing a scatter-gather list having at least one entry to provide said parameters to said XOR engine; and
control means for sequencing through all entries of said scatter-gather list to compute XOR parity values for corresponding to all entries in said scatter-gather list,
wherein the parity assist circuit is operable in accordance with parameters supplied by said scatter-gather means to read data previously stored in the cache memory by operation of the controller, and
wherein the parity assist circuit is operable to read the data to computer an XOR parity value without transferring the read data to a device external to the controller, and
wherein the parity assist circuit is configurable to generate a single interrupt applied to a CPU of the controller regardless of the number of XOR parity values computed by operation of the parity assist circuit.

27. The parity assist circuit of claim 26 further comprising:

a local memory within said parity assist circuit; and means for copying said scatter-gather list from an external memory to said local memory for further processing by said scatter-gather means.

28. The parity assist circuit of claim 27 further comprising:

register means for storing said parameters wherein said scatter-gather means programs said register means with said parameters for each entry in said scatter-gather list as said control means sequences through each of said entries in said scatter-gather list.

29. The parity assist circuit of claim 28 wherein said register means includes:

a plurality of operand register means wherein each of said-plurality of rand register means is programmed by said scatter-gather means to point to a corresponding operand parameter of a desired XOR computation;

a destination register means programmed to point to a destination parameter of a desired XOR computation; and a length register means programmed to indicate a length parameter of data pointed to by each of said plurality of operand register means and pointed to be said destination register means corresponding to a desired XOR computation.

30. A method operable within a parity assist circuit of a storage controller for computing parity values comprising the steps of:

storing data in a cache memory of the storage controller;

providing a scatter-gather list to said parity assist circuit wherein said scatter-gather list has at least one entry defining a desired XOR computation of a portion of the data;

sequencing through each of said entries in said scatter-gather list to perform a sequence of desired XOR computations defined by the entries of said scatter-gather list wherein the parity assist circuit is operable during sequencing to read the data stored in the cache memory to compute an XOR parity sum without transferring the read data to a device external to the controller; and generating as few as a single interrupt applied to a processor associated with the controller regardless of the number of XOR computations defined by entries of said scatter-gather list.

31. The method of claim 30, wherein said parity assist circuit includes a local memory and wherein the method further comprises the step of:

copying said scatter-gather list from an external memory to said local memory.

32. The method of claim 30 wherein said parity assist circuit includes registers used to define parameters of an XOR operation by said XOR engine and wherein the method step of sequencing includes the step of:

programming said registers with parameters of an XOR operation in accordance with values supplied in each entry of said scatter-gather list.

33. The method of claim 32 wherein said registers include a plurality of source operand registers and a destination register and a length register and wherein the step of programming includes:

programming each of said plurality of source operand registers with a source operand value from an entry of said scatter-gather list, programming said destination register with a destination value from said entry of said scatter-gather list; and programming said length register with a length value from said entry of said scatter-gather list.

34. The method of claim 30 further comprising the step of:

notifying the processor of the completion of requested XOR operation with a single generated interrupt only upon completion of the step of sequencing through each of said entries in said scatter-gather list.

* * * * *